US012581330B2

(12) United States Patent
Xue et al.

(10) Patent No.: US 12,581,330 B2
(45) Date of Patent: Mar. 17, 2026

(54) COMMUNICATION METHOD AND COMMUNICATIONS DEVICE

(71) Applicant: Huawei Technologies Co., Ltd., Shenzhen (CN)

(72) Inventors: Yifan Xue, Beijing (CN); Yu Cai, Beijing (CN); Xiaocui Li, Beijing (CN); Jian Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 744 days.

(21) Appl. No.: 17/267,730

(22) PCT Filed: Aug. 9, 2019

(86) PCT No.: PCT/CN2019/099933
§ 371 (c)(1),
(2) Date: Feb. 10, 2021

(87) PCT Pub. No.: WO2020/030085
PCT Pub. Date: Feb. 13, 2020

(65) Prior Publication Data
US 2021/0329481 A1 Oct. 21, 2021

(30) Foreign Application Priority Data
Aug. 10, 2018 (CN) .......................... 201810912068.5

(51) Int. Cl.
*H04W 24/08* (2009.01)
*H04W 72/0446* (2023.01)
*H04W 72/23* (2023.01)
(52) U.S. Cl.
CPC ....... *H04W 24/08* (2013.01); *H04W 72/0446* (2013.01); *H04W 72/23* (2023.01)

(58) Field of Classification Search
CPC . H04W 24/08; H04W 72/0446; H04W 72/23; H04W 52/0216; Y02D 30/70
See application file for complete search history.

(56) References Cited

U.S. PATENT DOCUMENTS 10,148,379 B2 * 12/2018 Jung ..................... H04L 5/0073
11,212,799 B2 * 12/2021 Fu .......................... H04L 5/0053
(Continued)

FOREIGN PATENT DOCUMENTS

CN 102056185 A 5/2011
CN 102291736 A 12/2011
(Continued)

OTHER PUBLICATIONS

"3rd Generation Partnership Project;Technical Specification Group Radio Access Network;NR; Physical layer procedures for control(Release 15)," 3GPP TS 38.213 V15.2.0, total 99 pages, 3rd Generation Partnership Project, Valbonne, France (Jun. 2018).
(Continued)

*Primary Examiner* — Jay P Patel
*Assistant Examiner* — Shehab A Alawdi
(74) *Attorney, Agent, or Firm* — Leydig, Voit & Mayer, Ltd.

(57) ABSTRACT

This application discloses a communication methods and a communications apparatuses. In a method, a network device sends first information to a terminal, where the first information is used to indicate a first search space, a second search space, a first monitoring parameter, and a second monitoring parameter. The first monitoring parameter is a monitoring parameter for monitoring a physical downlink control channel (PDCCH) in the first search space, the second monitoring parameter is a monitoring parameter for monitoring a PDCCH in the second search space, and the first search space is different from the second search space;
(Continued)

1001

Network device 1000

Processor

Memory

Communications interface

1004

1002 1003 or, the first search space is the same as the second search space but the first monitoring parameter is different from the second monitoring parameter.

18 Claims, 6 Drawing Sheets

(56) References Cited

U.S. PATENT DOCUMENTS

| | | | |
|---|---|---|---|
| 2013/0194956 A1 | 8/2013 | Sartori et al. | |
| 2017/0332377 A1* | 11/2017 | Tseng | H04W 72/0446 |
| 2018/0019844 A1* | 1/2018 | Nogami | H04L 5/0055 |
| 2018/0124748 A1 | 5/2018 | Baldemair et al. | |
| 2018/0152943 A1 | 5/2018 | Moulsley et al. | |
| 2019/0342777 A1* | 11/2019 | Tiirola | H04L 5/0091 |
| 2020/0053757 A1* | 2/2020 | Bagheri | H04W 72/1273 |

FOREIGN PATENT DOCUMENTS

| | | |
|---|---|---|
| CN | 102547996 A | 7/2012 |
| CN | 106027220 A | 10/2016 |
| CN | 108270536 A | 7/2018 |
| CN | 112352458 A | 2/2021 |
| JP | 2017529763 A | 10/2017 |
| JP | 2018509105 A | 3/2018 |
| JP | 2019536308 A | 12/2019 |
| JP | 2021503786 A | 2/2021 |
| WO | 2016047618 A1 | 3/2016 |
| WO | 2018126782 A1 | 7/2018 |
| WO | 2018127802 A1 | 7/2018 |

OTHER PUBLICATIONS

"3rd Generation Partnership Project;Technical Specification Group Radio Access Network;NR;Radio Resource Control (RRC) protocol specification(Release 15)," 3GPP TS 38.331 V15.2.1, total 303 pages, 3rd Generation Partnership Project, Valbonne, France (Jun. 2018).

Ericsson, "On DL signals and channels for NR-U," 3GPP TSG-RAN WG1 Meeting #93, Busan, Korea, Tdoc R1-1806251, total 4 pages, 3rd Generation Partnership Project, Valbonne, France (May 21-25, 2018).

Ericsson, "Indication of URLLC Configuration," 3GPP TSG-RAN WG1 Meeting #93, Busan, Korea, R1-1806017, Total 5 pages, 3rd Generation Partnership Project, Valbonne, France (May 21-25, 2018).

Samsung, "On UE Power Savings," 3GPP TSG RAN WG1 Meeting #92, Athens, Greece, R1-1801977, Samsung, Total 5 pages, 3rd Generation Partnership Project, Valbonne, France (Feb. 26-Mar. 2, 2018).

"Remaining issues on search space," 3GPP TSG RAN WG1 Meeting #91, Reno, USA, R1-1719983, Total 4 pages, 3rd Generation Partnership Project, Valbonne, France (Nov. 27-Dec. 1, 2017).

* cited by examiner

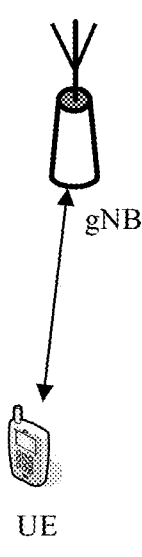

gNB

A network device sends first information to a terminal, where the first information is used to indicate a first search space, a second space, a first monitoring parameter, and a second monitoring parameter, the first monitoring parameter is a monitoring parameter of monitoring a PDCCH in the first search space by the terminal, and the second monitoring parameter is a monitoring parameter of monitoring a PDCCH in the second search space by the terminal

202

The network device sends the PDCCH in the first search space based on the first monitoring parameter, and the terminal monitors the PDCCH in the first search space based on the first monitoring parameter; or the network device sends the PDCCH in the second search space based on the second monitoring parameter, and the terminal monitors the PDCCH in the second search space based on the second monitoring parameter

FIG. 2

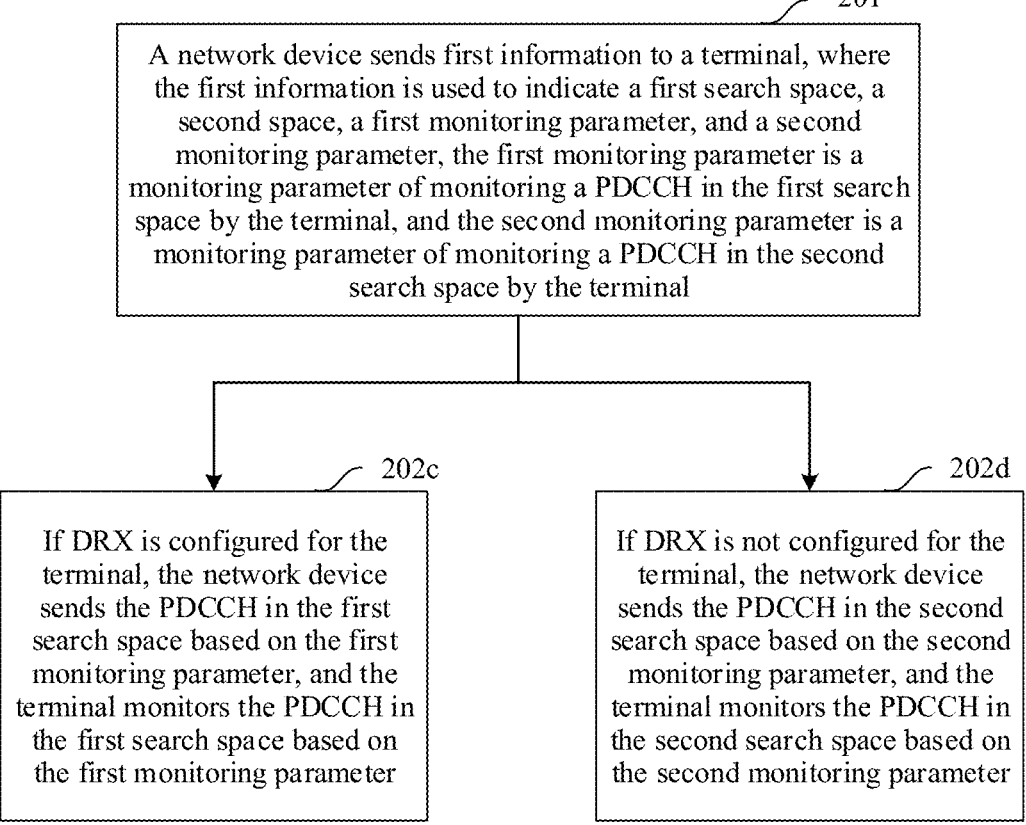

201

A network device sends first information to a terminal, where the first information is used to indicate a first search space, a second space, a first monitoring parameter, and a second monitoring parameter, the first monitoring parameter is a monitoring parameter of monitoring a PDCCH in the first search space by the terminal, and the second monitoring parameter is a monitoring parameter of monitoring a PDCCH in the second search space by the terminal 202c If DRX is configured for the terminal, the network device sends the PDCCH in the first search space based on the first monitoring parameter, and the terminal monitors the PDCCH in the first search space based on the first monitoring parameter 202d If DRX is not configured for the terminal, the network device sends the PDCCH in the second search space based on the second monitoring parameter, and the terminal monitors the PDCCH in the second search space based on the second monitoring parameter

FIG. 4

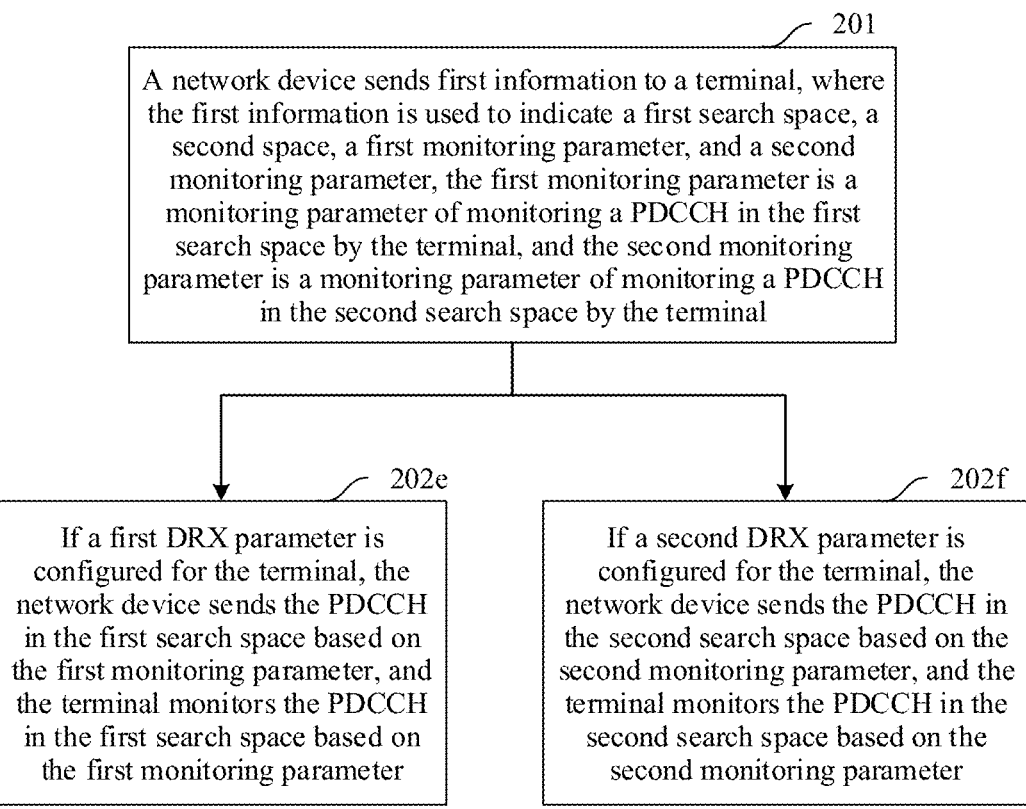

201

A network device sends first information to a terminal, where the first information is used to indicate a first search space, a second space, a first monitoring parameter, and a second monitoring parameter, the first monitoring parameter is a monitoring parameter of monitoring a PDCCH in the first search space by the terminal, and the second monitoring parameter is a monitoring parameter of monitoring a PDCCH in the second search space by the terminal 202e If a first DRX parameter is configured for the terminal, the network device sends the PDCCH in the first search space based on the first monitoring parameter, and the terminal monitors the PDCCH in the first search space based on the first monitoring parameter 202f If a second DRX parameter is configured for the terminal, the network device sends the PDCCH in the second search space based on the second monitoring parameter, and the terminal monitors the PDCCH in the second search space based on the second monitoring parameter

FIG. 6

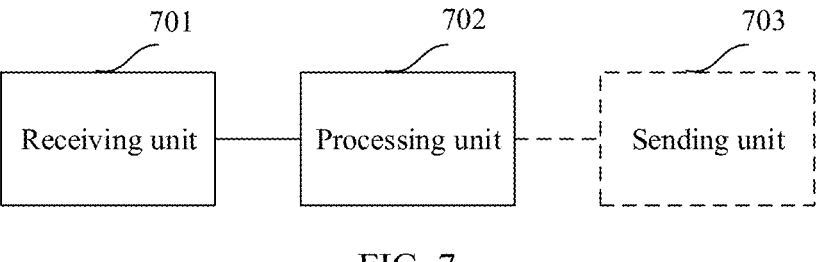

701

Receiving unit

702

Processing unit

703

Sending unit

FIG. 7

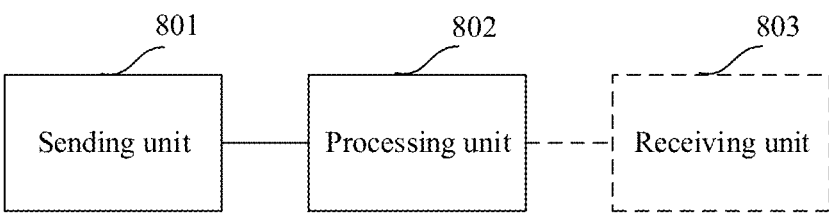

801

Sending unit

802

Processing unit

803

Receiving unit

FIG. 8

COMMUNICATION METHOD AND COMMUNICATIONS DEVICE

CROSS-REFERENCE TO RELATED APPLICATIONS

This application is a National Stage of International Application No. PCT/CN2019/099933, filed on Aug. 9, 2019, which claims priority to Chinese Patent Application No. 201810912068.5, filed on Aug. 10, 2018, both of which are hereby incorporated by reference in their entireties.

TECHNICAL FIELD

This application relates to the field of communications technologies, and in particular, to a communication method and a communications device.

BACKGROUND

A base station sends downlink control information (DCI) to a terminal by using a physical downlink control channel (PDCCH), to indicate configuration parameters such as a time-frequency resource on which the terminal receives downlink data, a modulation and coding scheme (MCS), and a redundancy version (RV).

When the terminal receives the DCI, blind detection (blind detect, or BD) is performed at a plurality of PDCCH candidate locations in a downlink control region. A group of PDCCH candidate locations form a search space. The base station may configure one or more search spaces for the terminal. The terminal performs monitoring in the configured one or more search spaces, to detect whether there is DCI sent to the terminal. The base station further configures, for the terminal, a parameter for monitoring the PDCCH in each search space, for example, a monitoring periodicity, a monitoring slot, an aggregation level of the PDCCH, and a maximum quantity of blind detection times.

In the prior art, the base station may send, to the terminal by using radio resource control (RRC) signaling, the one or more search spaces configured for the terminal and a monitoring parameter corresponding to each search space, and the terminal monitors the PDCCH in a corresponding search space based on the received monitoring parameter. However, when configuring the search space and the monitoring parameter for the terminal, the base station determines only the search space and the monitoring parameter that need to be currently used by the terminal. In this case, configuration is not flexible enough.

SUMMARY

This application provides a communication method and a communications device, to send one or more groups of search spaces and a plurality of groups of PDCCH monitoring parameters to a terminal, so that the terminal monitors a PDCCH in one group of search spaces based on one group of monitoring parameters.

According to a first aspect, this application provides a communication method, including: sending, by a network device, first information to a terminal, where the first information is used to indicate a first search space, a second search space, a first monitoring parameter, and a second monitoring parameter, the first monitoring parameter is a monitoring parameter for monitoring a PDCCH in the first search space by the terminal, the second monitoring parameter is a monitoring parameter for monitoring a PDCCH in the second search space by the terminal, and the first search space is different from the second search space, or the first search space is the same as the second search space but the first monitoring parameter is different from the second monitoring parameter; and after sending the first information, sending, by the network device, the PDCCH in the first search space based on the first monitoring parameter, so that the terminal monitors the PDCCH in the first search space based on the first monitoring parameter after receiving the first information; or after sending the first information, sending, by the network device, the PDCCH in the second search space based on the second monitoring parameter, so that the terminal monitors the PDCCH in the second search space based on the second monitoring parameter after receiving the first information. In a conventional PDCCH monitoring process, the network device sends a search space and a corresponding monitoring parameter to the terminal, and the terminal performs monitoring in all search spaces indicated by the network device. If the search space or the monitoring parameter needs to be changed, the network device needs to send a changed search space and all monitoring parameters to the terminal. However, in the foregoing method, the first information sent by the network device may carry a plurality of groups of search spaces and a plurality of groups of monitoring parameters, and the terminal monitors the PDCCH in one group of search spaces based on one group of monitoring parameters instead of monitoring the PDCCH in all the search spaces. If the search space or the monitoring parameter needs to be changed, instead of sending the search space and all the monitoring parameters, the network device only needs to instruct the terminal to switch the search space or the monitoring parameter.

With reference to the first aspect, in a first possible implementation of the first aspect, the network device sends second information to the terminal, where the second information is used to instruct the terminal to monitor the PDCCH in the first search space based on the first monitoring parameter, or is used to instruct the terminal to monitor the PDCCH in the second search space based on the second monitoring parameter.

In the foregoing method, the network device may send the second information to the terminal, to directly instruct the terminal to monitor the PDCCH in a specified search space based on a specified monitoring parameter. For example, the network device may preconfigure that the first search space and the first monitoring parameter correspond to an index 1, and the second search space and the second monitoring parameter correspond to an index 2. If the second indication information includes the index 1, it is used to instruct the terminal to monitor the PDCCH in the first search space based on the first monitoring parameter.

With reference to the first aspect, in a second possible implementation of the first aspect, the network device may send the second information to the terminal by using DCI, a media access control (MAC) control element (CE) (MAC CE), or RRC signaling.

With reference to the first aspect, in a third possible implementation of the first aspect, when the terminal is in a first working mode, the network device sends the PDCCH in the first search space based on the first monitoring parameter, and the terminal monitors the PDCCH in the first search space based on the first monitoring parameter; or when the terminal is in a second working mode, the network device sends the PDCCH in the second search space based on the second monitoring parameter, and the terminal monitors the PDCCH in the second search space based on the second monitoring parameter. In the foregoing manner, when the network device sends the PDCCH and the terminal monitors the PDCCH, a selected search space and a selected monitoring parameter are determined based on a working mode of the terminal.

With reference to the first aspect, in a fourth possible implementation of the first aspect, the network device may further send third information to the terminal, where the third information is used to indicate a working mode of the terminal. Alternatively, the working mode of the terminal may not need to be indicated by the network device. Instead, a working mode switching policy is preconfigured in the terminal and the network device. The terminal and the network device can determine, based on the working mode switching policy, a current working mode of the terminal.

With reference to the first aspect, in a fifth possible implementation of the first aspect, the network device may send the third information to the terminal by using DCI, a MAC CE, or RRC information.

With reference to the first aspect, in a sixth possible implementation of the first aspect, when discontinuous reception (DRX) is configured for the terminal, the network device sends the PDCCH in the first search space based on the first monitoring parameter, and the terminal monitors the PDCCH in the first search space based on the first monitoring parameter; or when DRX is not configured for the terminal, the network device sends the PDCCH in the second search space based on the second monitoring parameter, and the terminal monitors the PDCCH in the second search space based on the second monitoring parameter.

With reference to the first aspect, in a seventh possible implementation of the first aspect, when a first DRX parameter is configured for the terminal, the network device sends the PDCCH in the first search space based on the first monitoring parameter, and the terminal monitors the PDCCH in the first search space based on the first monitoring parameter; or when a second DRX parameter is configured for the terminal, the network device sends the PDCCH in the second search space based on the second monitoring parameter, and the terminal monitors the PDCCH in the second search space based on the second monitoring parameter.

With reference to the first aspect, in an eighth possible implementation of the first aspect, the foregoing monitoring parameter (which may be the first monitoring parameter or the second monitoring parameter) includes one or more of the following parameters: a format of monitored DCI, a monitoring periodicity, a monitoring slot, monitoring duration in a monitoring periodicity, a monitoring start symbol in a to-be-monitored slot, an aggregation level of a monitored PDCCH, and a quantity of PDCCH candidate locations that need to be monitored at the aggregation level.

According to a second aspect, an embodiment of this application provides a terminal. The terminal may include a receiving unit and a processing unit that are configured to implement functions implemented by the terminal in the method in any implementation of the first aspect.

According to a third aspect, an embodiment of this application provides a network device. The network device may include a sending unit and a processing unit that are configured to implement functions implemented by the network device in the method in any implementation of the first aspect.

According to a fourth aspect, an embodiment of this application provides a terminal device. The terminal may include a processor, a memory, and a communications interface. The memory is configured to store a program. The processor invokes the program stored in the memory, to use the communications interface to implement functions implemented by the terminal in the method in any implementation of the first aspect.

According to a fifth aspect, an embodiment of this application provides a network device. The network device may include a processor, a memory, and a communications interface. The memory is configured to store a program. The processor invokes the program stored in the memory, to use the communications interface to implement functions implemented by the network device in the method in any implementation of the first aspect.

According to a sixth aspect, an embodiment of this application provides a communications system. The communications system includes the terminal in the second aspect and the network device in the third aspect. Alternatively, the communications system may include the terminal device in the fourth aspect and the network device in the fifth aspect.

According to a seventh aspect, an embodiment of this application provides a computer readable storage medium. The computer readable storage medium stores a computer instruction. When the instruction is run on a computer, the computer is enabled to implement functions implemented by the terminal in the method in any implementation of the first aspect, or the computer is enabled to implement functions implemented by the network device in the method in any implementation of the first aspect.

According to an eighth aspect, an embodiment of this application provides a computer program product including an instruction. When the computer program product is run on a computer, the computer is enabled to implement functions implemented by the terminal in the method in any implementation of the first aspect, or the computer is enabled to implement functions implemented by the network device in the method in any implementation of the first aspect.

According to a ninth aspect, this application provides a chip. The chip is connected to a memory, and is configured to read and execute a software program stored in the memory, to implement functions implemented by the terminal in the method in any implementation of the first aspect or implement functions implemented by the network device in the method in any implementation of the first aspect.

BRIEF DESCRIPTION OF DRAWINGS

FIG. 1 is a schematic diagram of an application scenario according to an embodiment of this application;

FIG. 2 is a schematic flowchart 1 of a communication method according to an embodiment of this application;

FIG. 4 is a schematic flowchart 3 of a communication method according to an embodiment of this application;

FIG. 6 is a schematic flowchart 4 of a communication method according to an embodiment of this application;

FIG. 7 is a schematic structural diagram 1 of a terminal according to an embodiment of this application;

FIG. 8 is a schematic structural diagram 1 of a network device according to an embodiment of this application;

DESCRIPTION OF EMBODIMENTS

Figure 3:
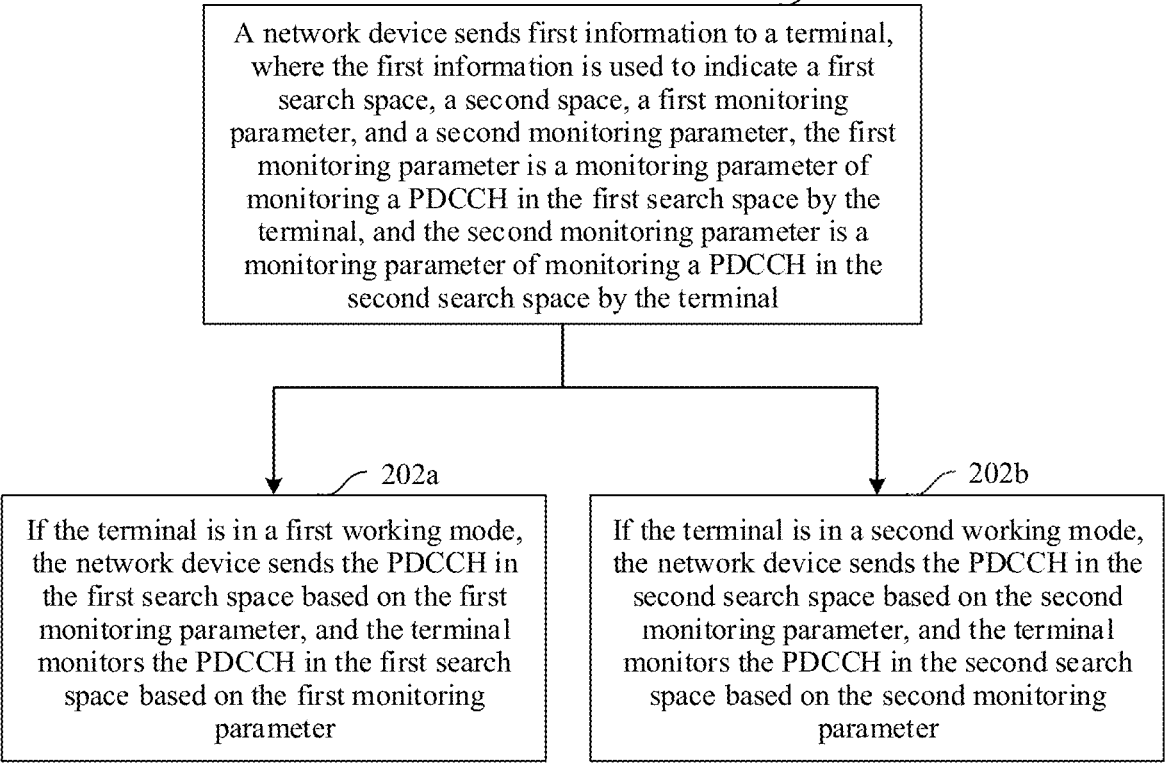
FIG. 3 is a schematic flowchart 2 of a communication method according to an embodiment of this application.

To make the objectives, technical solutions, and advantages of this application clearer, the following further describes this application in detail with reference to the accompanying drawings.

A base station may send, to a terminal by using RRC signaling, one or more search spaces configured for the terminal and a monitoring parameter corresponding to each search space. The terminal monitors a PDCCH in a corresponding search space based on the received monitoring parameter. However, when configuring the search space and the monitoring parameter for the terminal, the base station determines only the search space and the monitoring parameter that need to be currently used by the terminal. In this case, configuration is not flexible enough.

To implement more flexible configuration, the embodiments of this application provide a communication method and a communications apparatus. The method and the apparatus may be applied to a 5th generation (5G) mobile communications system, a long term evolution (LTE) system, or another communications system. The embodiments of this application may be applied to a scenario shown in FIG. 1.

When a network device in the embodiments of this application is a base station, the base station may be configured to mutually convert a received over-the-air frame and an Internet protocol (IP) packet and serve as a router between a wireless terminal and a rest portion of an access network, where the rest portion of the access network may include an IP network. The network device may be further configured to coordinate attribute management of the air interface. In communications systems using different radio access technologies, devices having a base station function may have different names. For example, a base station in a global system for mobile communications (GSM) or a code division multiple access (CDMA) system is referred to as a base transceiver station (BTS); a base station in a wideband code division multiple access (WCDMA) system is referred to as a nodeB; a base station in an LTE system is referred to as an evolved nodeB (evolutional nodeB, or eNB); a base station in an NR system is referred to as a general nodeB (gNB). This is not limited in the embodiments of this application.

The terminal device in the embodiments of this application may also be referred to as a user equipment (UE), an access terminal device, a subscriber unit, a subscriber station, a mobile station, a mobile console, a remote station, a remote terminal device, a mobile device, a user terminal device, a terminal device, a wireless communication device, a user agent, a user apparatus, or the like. The terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved public land mobile network (PLMN). This is not limited in the embodiments of this application.

FIG. 2 is a schematic flowchart of a communication method according to an embodiment of this application. As shown in the figure, the method may include the following steps.

Step 201: A network device sends first information to a terminal. The first information is used to indicate a first search space, a second space, a first monitoring parameter, and a second monitoring parameter. The first monitoring parameter is a monitoring parameter for monitoring a PDCCH in the first search space by the terminal. The second monitoring parameter is a monitoring parameter for monitoring a PDCCH in the second search space by the terminal.

The first search space and the second search space may be a same search space but the first monitoring parameter is different from the second monitoring parameter. In other words, the terminal may monitor a PDCCH in a same search space based on different monitoring parameters in different duration, different working modes, and different scenarios. Alternatively, the first search space and the second search space may be different search spaces but the first monitoring parameter may be the same as the second monitoring parameter. In other words, the terminal may monitor a PDCCH in different search spaces based on a same monitoring parameter in different duration, different working modes, and different scenarios. Alternatively, the first search space is different from the second search space and the first monitoring parameter is also different from the second monitoring parameter. In other words, the terminal may monitor a PDCCH in different search spaces based on monitoring parameters of the search spaces in different duration, different working modes, and different scenarios.

Step 202: The network device sends the PDCCH in the first search space based on the first monitoring parameter, and the terminal monitors the PDCCH in the first search space based on the first monitoring parameter; or the network device sends the PDCCH in the second search space based on the second monitoring parameter, and the terminal monitors the PDCCH in the second search space based on the second monitoring parameter.

In a conventional PDCCH monitoring process, the network device sends a search space and a corresponding monitoring parameter to the terminal, and the terminal performs monitoring in all search spaces indicated by the network device. If the search space or the monitoring parameter needs to be changed, the network device needs to send a changed search space and all monitoring parameters to the terminal. However, in the foregoing method, the first information sent by the network device may carry a plurality of groups of search spaces and a plurality of groups of monitoring parameters, and the terminal monitors the PDCCH in one group of search spaces based on corresponding monitoring parameters instead of monitoring the PDCCH in all the search spaces. If the search space or the monitoring parameter needs to be changed, instead of sending the search space and all the monitoring parameters, the network device only needs to instruct the terminal to switch the search space or the monitoring parameter.

It should be understood that, that the first information described in the foregoing embodiment includes the first search space, the second search space, the first monitoring parameter, and the second monitoring parameter does not indicate that the first information includes only these pieces of information. The first information may further include a third search space, a third monitoring parameter, and the like.

If the first information further includes the third search space and the third monitoring parameter, the network device may further indicate that the third search space and the third monitoring parameter belong to a same first monitoring group as the first search space and the first monitoring parameter. In other words, in same duration, the terminal may monitor the PDCCH in the first search space based on the first monitoring parameter, and may also monitor the PDCCH in the third search space based on the third monitoring parameter. Alternatively, the network device may indicate that the third search space and the third monitoring parameter belong to a same second monitoring group as the second search space and the second monitoring parameter. In other words, in same duration, the terminal may monitor the PDCCH in the second search space based on the second monitoring parameter, and may also monitor the PDCCH in the third search space based on the third monitoring parameter. Alternatively, the network device may indicate that the third search space and the third monitoring parameter belong to a third monitoring group. In other words, when the terminal monitors the PDCCH in the third search space based on the third monitoring parameter, the terminal does not monitor the PDCCH in the first search space based on the first monitoring parameter, and also does not monitor the PDCCH in the second search space based on the second monitoring parameter.

Optionally, the foregoing monitoring parameter may include one of or a combination of the following parameters:

Format of monitored DCI (DCI format): The DCI transmitted by the network device by using the PDCCH has a plurality of formats. Different formats are used based on different purposes and scenarios. For example, DCI used to schedule a physical uplink shared channel (PUSCH) may have a format different from DCI used to schedule a physical downlink shared channel (PDSCH). The network device may instruct the terminal to monitor DCI in one or more formats in a corresponding search space. For example, a format of DCI that the network device may instruct the terminal to monitor in the first search space is DCI-format0-0-AndFormat1-0, DCI-format2-0, DCI-format2-1, DCI-format2-2, or DCI-format2-3; and a format of DCI that the network device may instruct the terminal to monitor in the second search space is DCI-format0-0-AndFormat1-0, or DCI-format2-0.

Monitoring periodicity: The network device may configure a monitoring periodicity for the terminal, to instruct the terminal to monitor a PDCCH in a search space based on the monitoring periodicity. The monitoring periodicity may be in a unit of a slot. For example, if the monitoring periodicity indicated by the network device is 8, it indicates that the monitoring periodicity is eight slots. Certainly, the unit of the monitoring periodicity is not limited to a slot, and may alternatively be milliseconds (ms), a subframe, or the like.

Monitoring slot: The monitoring slot is used to indicate a slot in which the terminal monitors a PDCCH. Generally, the terminal monitors one slot in one monitoring periodicity. For example, if the network device may indicate that the monitoring periodicity is 10 slots, the monitoring slot is a slot 0. Certainly, the terminal may also monitor a plurality of slots in one monitoring periodicity. If the plurality of monitored slots are consecutive slots, a monitoring slot parameter may further include a monitoring start slot and monitoring duration. The monitoring start slot indicates a slot from which the terminal starts to perform monitoring in one monitoring periodicity, and the monitoring duration indicates a quantity of continuously monitored slots in one monitoring periodicity. Alternatively, the network device may indicate, by using a bitmap, specified slots in which monitoring is performed in one monitoring periodicity. To be specific, each bit corresponds to one slot in the monitoring periodicity, and a value of the bit indicates whether to monitor the slot. The bit map is used to instruct the terminal to monitor one slot, a plurality of consecutive slots, or a plurality of inconsecutive slots in one monitoring periodicity. Certainly, a time unit indicated by the network device may alternatively be milliseconds (ms), a subframe, or the like. In this case, the network device may alternatively send parameters such as a monitoring time (ms) and a monitoring subframe.

Generally, the two parameters: the monitoring periodicity and the monitoring slot are sent together to the terminal for use, and are sent to the terminal by using a "monitoring slot periodicity and offset (monitoringSlotPeriodicityAndOffset)" parameter.

Monitoring duration in a to-be-monitored slot: The duration is used to indicate duration of monitoring performed by the terminal in a slot that needs to be monitored. A unit of the duration may be a symbol.

Monitoring start symbol in a to-be-monitored slot (monitoringSymbolsWithinSlot): The symbol is used to indicate a start symbol of monitoring a PDCCH by the terminal in a slot that needs to be monitored. For example, one slot includes 14 symbols that respectively correspond to 14 bits. If a value of the 14 bits is 10000001000000, it indicates that the terminal starts to monitor a PDCCH from a symbol 0 and a symbol 7 in one to-be-monitored slot. Further, if a value of duration is 3, that is, one time of monitoring lasts for three symbols, the terminal monitors a PDCCH on a symbol 0, a symbol 1, a symbol 2, a symbol 7, a symbol 8, and a symbol 9.

Aggregation level of a monitored PDCCH and a quantity (nrofCandidates) of PDCCH candidate locations that need to be monitored at the aggregation level:

The aggregation level (aggregationLevelx) indicates a quantity of control channel elements (CCEs) included in one PDCCH. If one PDCCH includes one CCE, an aggregation level of the PDCCH is 1; if one PDCCH includes two CCEs, an aggregation level of the PDCCH is 2; and so on. Common aggregation levels are 1, 2, 4, 8, and 16.

The quantity of monitored PDCCH candidate locations indicates a maximum quantity of PDCCH candidate locations monitored in a search space by the terminal. For example, if one search space includes eight CCEs, for a PDCCH whose aggregation level is 1, there are eight PDCCH candidate locations. If a quantity that is of monitored PDCCH candidate locations and that is indicated by the network device is 6, it indicates that the terminal selects, according to a preset rule, six PDCCH candidate locations from the eight PDCCH candidate locations for monitoring.

Type of a search space (searchSpaceType): The type is used to indicate whether a search space indicated by the network device is a common search space (common) or a user equipment-specific search space (UE-specific).

In a possible implementation, before step 202, the network device may further send second information to the terminal. The second information is used to instruct the terminal to monitor the PDCCH in the first search space based on the first monitoring parameter, or is used to instruct the terminal to monitor the PDCCH in the second search space based on the second monitoring parameter. In this manner, the network device determines a specified search space and a specified monitoring parameter, and instructs the terminal to monitor the PDCCH in the specified search space based on the specified monitoring parameter.

For example, the network device may preconfigure that the first search space and the first monitoring parameter correspond to an index 1, the second search space and the second monitoring parameter correspond to an index 2, and the third search space and the third monitoring parameter correspond to an index 3. If the network device determines that the terminal should monitor the PDCCH in the first search space based on the first monitoring parameter, and determines that the network device sends the PDCCH in the first search space based on the first monitoring parameter, the second information sent by the network device may include indication information of the index 1. If the network device determines that the terminal should monitor the PDCCH in the second search space based on the second monitoring parameter and monitor the PDCCH in the third search space based on the third monitoring parameter, the second information sent by the network device may include indication information of the index 2 and the index 3.

For another example, the network device may preconfigure that the first search space, the first monitoring parameter, the third search space, and the third monitoring parameter correspond to a monitoring group 1, and the second search space and the second monitoring parameter correspond to a monitoring group 2. If the network device determines that the network device sends the PDCCH based on the monitoring parameters in the monitoring group 1 and the terminal should monitor the PDCCH based on the monitoring parameters in the monitoring group 1, the second information sent by the network device may include indication information of the monitoring group 1.

Optionally, the network device may add the first information and the second information to same signaling, and send the signaling to the terminal. Generally, the first information is usually sent to the terminal by using RRC signaling. In this case, the network device may add the first information and the second information to the RRC signaling, and send the RRC signaling to the terminal. Certainly, the network device may alternatively send the first information and the second information to the terminal by using other signaling. This is not limited in this embodiment of this application.

In addition, the network device may send the first information and the second information to the terminal by using different signaling. In this case, when sending the second information, the network device may send the second information to the terminal by using DCI, a MAC CE, or RRC signaling. The DCI signaling belongs to physical layer signaling, the MAC CE signaling belongs to MAC layer signaling, and the RRC signaling belongs to RRC layer signaling. When parsing the signaling, the terminal sequentially undergoes physical layer parsing, MAC layer parsing, and RRC layer parsing. Therefore, if the second information is sent by using the DCI signaling, a delay is relatively short; if the second information is sent by using the RRC signaling, a delay is relatively long; or if the second information is sent by using the MAC CE signaling, a delay is between the delay of performing sending by using the DCI signaling and the delay of performing sending by using the RRC signaling.

Further, after step 202, the network device may further send an indication information to the terminal when determining that the search space and the monitoring parameter for monitoring the PDCCH by the terminal need to be changed, to indicate the changed search space and the changed monitoring parameter to the terminal. Similar to the second information, the indication information may include index information of the changed search space and the changed monitoring parameter, or include index information of the changed monitoring group. The indication information may also be sent to the terminal by using DCI, a MAC CE, or RRC signaling.

In a conventional PDCCH monitoring process, if the network device determines that the search space and the monitoring parameter for the terminal need to be changed, the network device sends the changed search space and the corresponding monitoring parameter to the terminal through an RRC reconfiguration process. In this case, signaling overheads are relatively high. In the foregoing implementation, the network device has sent the plurality of possible search spaces and the corresponding monitoring parameters in the first information to the terminal. The indication information may include only the index information corresponding to the changed search space and the monitoring parameter, thereby reducing signaling overheads. In addition, if the indication information is sent by using DCI or MAC CE information, a delay is further reduced.

In a possible implementation, step S202 may specifically include two cases shown in FIG. 3:

Step 202*a*: If the terminal is in a first working mode, the network device sends the PDCCH in the first search space based on the first monitoring parameter, and the terminal monitors the PDCCH in the first search space based on the first monitoring parameter.

Step 202*b*: If the terminal is in a second working mode, the network device sends the PDCCH in the second search space based on the second monitoring parameter, and the terminal monitors the PDCCH in the second search space based on the second monitoring parameter.

In the foregoing implementation, the network device may preconfigure that the first search space and the first monitoring parameter correspond to the first working mode, and the second search space and the second monitoring parameter correspond to the second working mode. In this case, the network device and the terminal may determine, based on a current working mode of the terminal, the search space and the monitoring parameter that are used for sending/monitoring the PDCCH.

It should be understood that working parameters corresponding to the first working mode include the first search space and the first monitoring parameter. However, this is not limited thereto. For example, the first working mode may further be related to parameters such as a value of an operating bandwidth of the terminal, a quantity of activated carriers, and a quantity of transmit/receive antennas during multiple-antenna multiple-input multiple-output (MIMO) communication. In a specific example, the network device configures that: an operating bandwidth of the terminal is 20 MHz, three carriers are activated, the terminal monitors the PDCCH in a search space 1 based on a monitoring parameter 1, and the like, when the terminal works in the first working mode; and an operating bandwidth of the terminal is 10 MHz, one carrier is activated, the terminal monitors the PDCCH in a search space 1 based on a monitoring parameter 1, and the like, when the terminal works in the second working mode. In this case, when the terminal determines to switch from the first working mode to the second working mode, the terminal monitors the PDCCH in a search space 2 based on a monitoring parameter 2, the working bandwidth is switched from 20 MHz to 10 MHz, and three activated carriers is changed to one activated carrier. Certainly, various parameters configured by the network device may be sent to the terminal by using a same piece of signaling or a plurality of pieces of signaling.

In some embodiments, the network device may send a third information to the terminal. The third information is used to indicate a working mode of the terminal. Specifically, a working mode switching policy of the terminal may be preconfigured in the network device. The network device may determine the current working mode of the terminal based on factors such as the working mode switching policy, a current network environment, a status of the terminal, and a requirement of the terminal; and send, to the terminal, the third information that is used to indicate the working mode of the terminal. If the third information indicates that the terminal works in the first working mode, the terminal monitors the PDCCH in the first search space based on the first monitoring parameter. Correspondingly, after sending the third information, the network device sends the PDCCH in the first search space based on the first monitoring parameter. If the third information indicates that the terminal works in the second working mode, the terminal monitors the PDCCH in the second search space based on the second monitoring parameter. Correspondingly, after sending the third information, the network device sends the PDCCH in the second search space based on the second monitoring parameter.

Optionally, the network device may send the third information to the terminal by using DCI, a MAC CE, or RRC signaling.

In some other embodiments, a working mode switching policy of the terminal may be preconfigured in both the network device and the terminal. The network device and the terminal may both determine the current working mode of the terminal based on factors such as the working mode switching policy, a current network environment, a status of the terminal, and a requirement of the terminal. For example, if the network device does not send the DCI to the terminal in preset duration, the terminal and the network device may determine to switch the working mode of the terminal according to the preset working mode switching policy, to reduce a quantity of times that the terminal monitors the PDCCH. In this case, the network device may not need to send, to the terminal, a information used to indicate the working mode.

In some other embodiments, a working mode switching policy may be preconfigured in the terminal. The terminal determines a current working mode based on factors such as the working mode switching policy, a current network environment, a status of the terminal, and a requirement of the terminal. After determining to switch the working mode, the terminal may send a fourth information to the network device, to notify the network device of a switched-to working mode, so that the network device sends a PDCCH and the terminal monitors the PDCCH in a same search space based on a same monitoring parameter. The fourth information may be sent to the network device by using uplink control information (UCI), a MAC CE, or RRC signaling. For example, when a quantity of electricity of the terminal decreases to a preset threshold, the terminal may switch to a power saving mode. The power saving mode corresponds to the search space 1 and the monitoring parameter 1. In this mode, a maximum quantity of times that the terminal monitors the PDCCH is less than a maximum quantity of monitoring times in another working mode. In this case, the terminal monitors the PDCCH in the search space 1 based on the monitoring parameter 1. The terminal sends the fourth information to the network device. The fourth information is used to indicate that the terminal switches to the power saving mode. Therefore, the network device sends the PDCCH in the search space 1 based on the monitoring parameter.

Optionally, after receiving an indication information that is sent by the terminal and that is used to instruct to switch a working mode, the network device may send a response information to the terminal, to indicate whether the network device successfully switches the working mode, thereby ensuring that the terminal and the network device work in the same working mode. In this way, the following case is avoided: A information is incorrectly sent or received due to different working modes of the terminal and the network device. Specifically, the response information sent by the network device may be used to indicate whether the switching succeeds. For example, "1" is used to indicate that the switching succeeds, and "0" is used to indicate that the switching fails. Alternatively, the network device may add, to the response information, information about the working mode currently determined by the network device. For example, if the network device switches from a working mode 1 to a working mode 2, the response information carries information about the working mode 2. If the switching fails, the response information carries a information of the working mode 1. In this case, the response information is similar to the third information in the foregoing embodiment, and is used to instruct the terminal to work in the corresponding working mode based on the information about the working mode carried in the information.

In another possible implementation, step S202 may alternatively specifically include two cases shown in FIG. 4:

Step 202c: If DRX is configured for the terminal, the network device sends the PDCCH in the first search space based on the first monitoring parameter, and the terminal monitors the PDCCH in the first search space based on the first monitoring parameter.

Step 202d: If DRX is not configured for the terminal, the network device sends the PDCCH in the second search space based on the second monitoring parameter, and the terminal monitors the PDCCH in the second search space based on the second monitoring parameter.

In the foregoing implementation, the network device may preconfigure that the first search space and the first monitoring parameter correspond to a case in which DRX is configured for the terminal, and the second search space and the second monitoring parameter correspond to a case in which DRX is not configured for the terminal. In this case, the network device and the terminal may determine, based on whether DRX is currently configured for the terminal, the search space and the monitoring parameter that are used for sending/monitoring the PDCCH.

Figure 5:
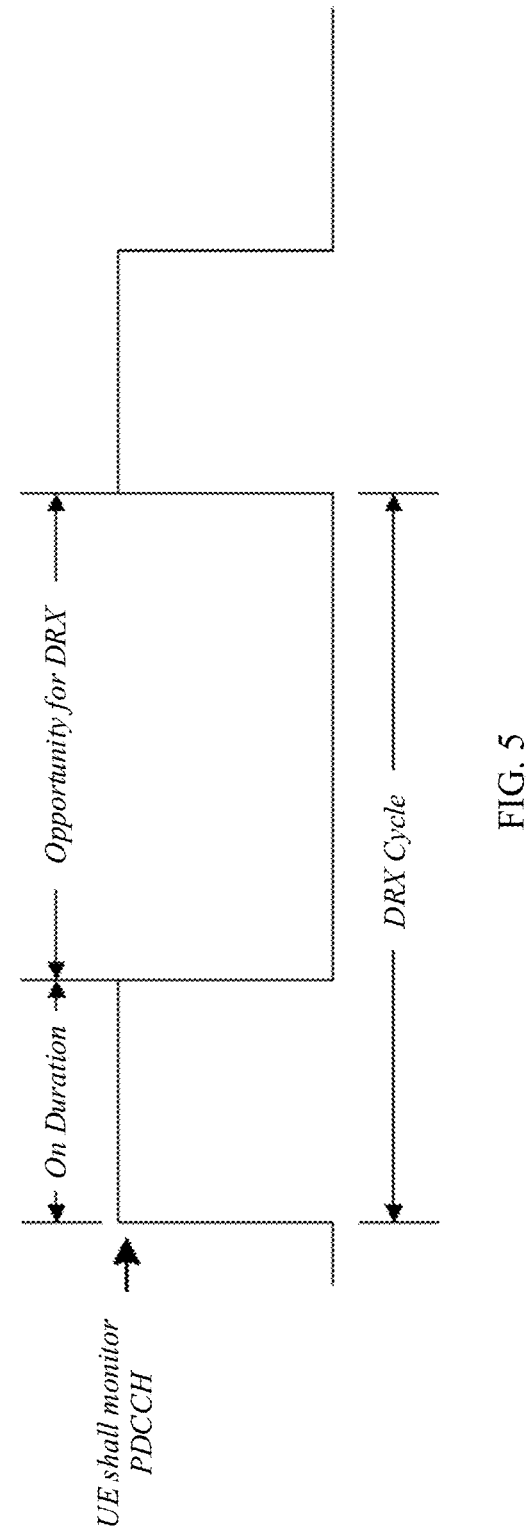
FIG. 5 is a schematic diagram of DRX according to an embodiment of this application.

Specifically, DRX may be configured for the terminal in an RRC_CONNECTED (RRC_connected) mode. In other words, as shown in FIG. 5, instead of continuously monitoring the PDCCH, the terminal monitors the PDCCH in on duration and does not monitor the PDCCH in an opportunity for DRX, thereby reducing power consumption of the terminal. One on duration and one opportunity for DRX form one DRX cycle.

For example, if DRX is not configured for the terminal, the terminal may monitor the PDCCH according to the monitoring periodicity in the foregoing embodiment. Because a monitoring time is relatively long, the PDCCH may be monitored by using a monitoring parameter by using which a quantity of times of monitoring the PDCCH in one monitoring periodicity is relatively small. If DRX is configured for the terminal, the PDCCH may be monitored by using a monitoring parameter by using which a quantity of times of monitoring the PDCCH in one monitoring periodicity is relatively large.

It should be understood that, if DRX is configured for the terminal, monitoring the PDCCH in some slots in the monitoring periodicity in the foregoing embodiment means further setting a monitoring periodicity in the on duration. In other words, the terminal monitors the PDCCH in some slots in the on duration, and does not monitor the PDCCH in other slots of the on duration.

In addition, if DRX is configured for the terminal but a configured DRX parameter changes according to different requirements in different scenarios, step 202 may alternatively specifically include two cases shown in FIG. 6:

Step 202e: If a first DRX parameter is configured for the terminal, the network device sends the PDCCH in the first search space based on the first monitoring parameter, and the terminal monitors the PDCCH in the first search space based on the first monitoring parameter.

Step 202f: If a second DRX parameter is configured for the terminal, the network device sends the PDCCH in the second search space based on the second monitoring parameter, and the terminal monitors the PDCCH in the second search space based on the second monitoring parameter.

The DRX parameter may include duration of one DRX cycle, duration of on duration in one cycle, a start location of on duration in one cycle, duration of an inactivity timer (InactivityTimer), duration of a hybrid automatic repeat request (HARQ) retransmission timer, and the like.

It should be understood that the foregoing first DRX parameter and the foregoing second DRX parameter may separately include one or more parameters. In other words, the first DRX parameter and the second DRX parameter may be used to indicate parameter groups.

In the foregoing implementation, the network device may preconfigure that the first search space and the first monitoring parameter correspond to the first DRX parameter, and the second search space and the second monitoring parameter correspond to the second DRX parameter. In this case, the network device and the terminal may determine, based on the DRX parameter configured for the terminal, the search space and the monitoring parameter that are used for sending/monitoring the PDCCH.

To further clearly explain the foregoing embodiment of this application, the following provides description by using examples.

Embodiment 1

In a conventional process of configuring a search space and a monitoring parameter of a PDCCH, the network device may send RRC signaling to the terminal. The signaling may include a list of to-be-added search spaces (searchSpacesToAddModList) and a list of to-be-deleted search spaces (searchSpacesToReleaseList) to indicate a search space of the PDCCH of the terminal.

To reduce changes to an existing solution, the foregoing parameters may still be used to indicate the first search space of the terminal, and an index corresponding to the first search space may be normal. In addition, a new parameter: a list of search spaces for power saving (searchSpacesFor-PowerSavingToAddModList) is added to indicate the second search space. An index corresponding to the second search space may be power saving (powerSaving).

The network device may further add a new parameter (usage) to the foregoing information. A value of the parameter may indicate normal or powerSaving, that is, the parameter is used to indicate whether the terminal monitors the PDCCH by using the first search space or by using the second search space. The parameter may also be default. If the parameter is default, the terminal uses a default value: normal. Alternatively, the network device may send, to the terminal by using DCI, a MAC CE, or RRC signaling, an indication information including the foregoing parameter (usage).

Then, if the network device determines to change the PDCCH monitored by the terminal, the network device may send, to the terminal by using DCI, a MAC CE, or RRC signaling, the indication information including the foregoing parameter (usage), to indicate a changed search space to the terminal.

Embodiment 2

In a conventional process of configuring a search space and a monitoring parameter of a PDCCH, the network device may send RRC signaling to the terminal. The signaling may include a monitoring slot periodicity and offset (monitoringSlotPeriodicityAndOffset), a monitoring start symbol in a to-be-monitored slot (monitoringSymbolsWithinSlot), monitoring duration in a to-be-monitored slot, an aggregation level of a monitored PDCCH, and a quantity (nrofCandidates) of PDCCH candidate locations that need to be monitored at the aggregation level.

To reduce changes to an existing solution, the foregoing parameters may still be used to indicate the first monitoring parameter to the terminal, and an index corresponding to the first monitoring parameter may be normal. Specifically, the monitoring periodicity is two slots, the monitoring slot is a slot 0, monitoring starts from a symbol 0 and a symbol 7 in the to-be-monitored slot, and monitoring lasts for three symbols. In other words, the terminal monitors the PDCCH on the symbol 0, a symbol 1, a symbol 2, the symbol 7, a symbol 8, and a symbol 9. The aggregation level of the monitored PDCCH and the quantity (nrofCandidates) of PDCCH candidate locations that need to be monitored at the aggregation level may be shown in Table 1.

TABLE 1

| | |
|---|---|
| Aggregation level 1 | 8 |
| Aggregation level 2 | 8 |
| Aggregation level 4 | 6 |
| Aggregation level 8 | 4 |
| Aggregation level 16 | 2 |

In addition, a new parameter: a monitoring slot periodicity and offset for power saving (monitoringSlotPeriodicity-AndOffsetForPowerSaving) is added, to indicate that the monitoring periodicity is 10 slots and monitoring is performed on the slot 0; and new parameters: a monitoring start symbol in a to-be-monitored slot for power saving (monitoringSymbolsWithinSlot ForPowerSaving) and monitoring duration in a to-be-monitored slot for power saving (durationForPowerSaving) are added, to indicate that monitoring is performed on a symbol 0, a symbol 1, and a symbol 2 in one to-be-monitored slot. The aggregation level of the monitored PDCCH and the quantity (nrofCandidates) of PDCCH candidate locations that need to be monitored at the aggregation level are shown in Table 2.

TABLE 2

| | |
|---|---|
| Aggregation level 1 | 4 |
| Aggregation level 2 | 4 |
| Aggregation level 4 | 3 |
| Aggregation level 8 | 2 |
| Aggregation level 16 | 1 |

It may be learned from Table 1 that, in a to-be-monitored slot, a maximum quantity of blind detection times is 8+8+6+4+2=28. It may be learned from the first monitoring parameter that, in 10 slots (five monitoring periodicities), a maximum quantity of blind detection times of the terminal is 28*5=140. It may be learned from Table 2 that, in a to-be-monitored slot, a maximum quantity of blind detection times is 4+4+3+2+1=14. It may be learned from the second monitoring parameter that, in 10 slots (one monitoring periodicity), a maximum quantity of blind detection times of the terminal is 10. Therefore, when the terminal uses the second monitoring parameter, a time required for monitoring the PDCCH is shorter, thereby reducing power consumption of the terminal.

The network device may further add a new parameter (usage). A value of the parameter may indicate normal or powerSaving, that is, the parameter is used to indicate whether the terminal uses the first monitoring parameter or uses the second monitoring parameter. The parameter may also be default. If the parameter is default, the terminal uses a default value: normal.

Then, if the network device determines to change the PDCCH monitored by the terminal, the network device may send, to the terminal by using DCI, a MAC CE, or RRC signaling, an indication information including the foregoing parameter (usage).

Embodiment 3

The terminal may have two working modes: a normal working mode (normal mode) and a power saving mode (power saving mode). Each search space corresponds to one working mode. For example, the search space 1 and the monitoring parameter 1 correspond to a middle-class working mode, and the search space 2 and the monitoring parameter 2 correspond to a power-saving working mode. Information that is of the search space and the monitoring parameter and that is sent by the network device to the terminal is similar to that in Embodiments 1 and 2. Details are not described herein again.

The network device may send DCI, a MAC CE, or RRC signaling to the terminal. The signaling includes a working mode parameter (mode). A value of the parameter may indicate the normal working mode or the power saving working mode, to indicate the working mode of the terminal.

In this embodiment, the working mode that is of the terminal and that is indicated by the network device is not merely used to indicate the search space and the monitoring parameter for monitoring the PDCCH by the terminal, and may be further used to indicate a value of an operating bandwidth of the terminal, a quantity of activated carriers, and the like.

Embodiment 4

The network device may configure a group of a search space and a monitoring parameter for the terminal to be used by the terminal to monitor the PDCCH when DRX is not configured for the terminal. The network device may further configure another group of a search space and a monitoring parameter for the terminal to be used by the terminal to monitor the PDCCH when DRX is configured for the terminal.

The network device may send signaling such as DCI, a MAC CE, or RRC signaling to the terminal. The signaling may include a parameter indicating whether DRX is configured for the terminal. In addition, the signaling may further carry a DRX configuration parameter, for example, a DRX cycle or duration of on duration.

Embodiment 5

The network device may configure the search space 1 and the monitoring parameter 1 for the terminal to be used by the terminal to monitor the PDCCH when a DRX cycle of is less than 50 ms. The network device may further configure the search space 2 and the monitoring parameter 2 for the terminal to be used by the terminal to monitor the PDCCH when a DRX cycle is greater than or equal to 50 ms. Information that is of the search space and the monitoring parameter and that is sent by the network device to the terminal is similar to that in Embodiments 1 and 2. Details are not described herein again.

The network device may send signaling such as DCI, a MAC CE, or RRC signaling to the terminal. The signaling may include a DRX parameter configured for the terminal. The DRX parameter includes a DRX cycle and the like. The terminal and the network device may determine to use the first group of the search space and the monitoring parameter or the second group of the search space and the monitoring parameter based on the DRX parameter.

Embodiment 6

The network device may configure the search space 1 and the monitoring parameter 1 for the terminal. The monitoring parameter 1 includes a DCI format parameter that indicates a format of DCI for monitoring performed by the terminal is DCI-format0-0-AndFormat1-0, DCI-format2-0, DCI-format2-1, DCI-format2-2, or DCI-format2-3. The network device may further configure the search space 2 and the monitoring parameter 2 for the terminal. The monitoring parameter 2 also includes a DCI format parameter that indicates a format of DCI for monitoring performed by the terminal is DCI-format0-0-AndFormat1-0, or DCI-format2-0.

The foregoing DCI formats are merely examples. The format that is of DCI for monitoring performed by the terminal and that is indicated by the network device may be a DCI format in a 5G system, a DCI format in an LTE system, or another future DCI format. For example, some future DCI formats may further indicate whether the terminal is inactive for a period of time, how long the terminal wakes up from an inactive state, and the like.

Information that is of the search space and the monitoring parameter and that is sent by the network device to the terminal is similar to that in Embodiments 1 and 2. Details are not described herein again.

It should be understood that the name of the search space list, the name of the search space index, the parameter name, the name of the DCI format, and the like added in the foregoing specific embodiments are all examples and do not constitute limitation on this embodiment of this application.

Based on a same technical concept, an embodiment of this application further provides a terminal, to implement functions of the terminal in the foregoing method embodiments. As shown in FIG. 7, the terminal may include a receiving unit 701 and a processing unit 702.

The receiving unit 701 is configured to receive first information sent by a network device. The first information is used to indicate a first search space, a second search space, a first monitoring parameter, and a second monitoring parameter. The first monitoring parameter is a monitoring parameter for monitoring a PDCCH in the first search space by the terminal. The second monitoring parameter is a monitoring parameter for monitoring a PDCCH in the second search space by the terminal. The first search space is different from the second search space. Alternatively, the first search space is the same as the second search space but the first monitoring parameter is different from the second monitoring parameter.

The processing unit 702 is configured to: monitor the PDCCH in the first search space based on the first monitoring parameter, or monitor, by the terminal, the PDCCH in the second search space based on the second monitoring parameter.

In a possible implementation, the receiving unit 701 is further configured to receive second information sent by the network device.

The second information is used to instruct the terminal to monitor the PDCCH in the first search space based on the first monitoring parameter, or the second information is used to instruct the terminal to monitor the PDCCH in the second search space based on the second monitoring parameter.

In a possible implementation, the second information is sent to the terminal by using DCI, a MAC CE, or RRC signaling.

In a possible implementation, the processing unit 702 is specifically configured to: when the terminal is in a first working mode, monitor the PDCCH in the first search space based on the first monitoring parameter; or when the terminal is in a second working mode, monitor the PDCCH in the second search space based on the second monitoring parameter.

In a possible implementation, the receiving unit 701 is further configured to receive third information sent by the network device. The third information is used to indicate a working mode of the terminal.

In a possible implementation, the third information is sent to the terminal by using DCI, a MAC CE, or RRC signaling.

In a possible implementation, the processing unit 702 is specifically configured to: when DRX is configured for the terminal, monitor the PDCCH in the first search space based on the first monitoring parameter; or when DRX is not configured for the terminal, monitor the PDCCH in the second search space based on the second monitoring parameter.

In a possible implementation, the processing unit 702 is specifically configured to: when a first DRX parameter is configured for the terminal, monitor the PDCCH in the first search space based on the first monitoring parameter; or when a second DRX parameter is configured for the terminal, monitor the PDCCH in the second search space based on the second monitoring parameter.

In a possible implementation, the monitoring parameter includes one or more of the following parameters: a format of monitored DCI, a monitoring periodicity, a monitoring slot, monitoring duration in a to-be-monitored slot, a monitoring start symbol in a to-be-monitored slot, an aggregation level of a monitored PDCCH, and a quantity of PDCCH candidate locations that need to be monitored at the aggregation level.

In a possible implementation, the terminal may further include a sending unit 703, configured to send indication information used to indicate the working mode of the terminal.

Based on a same technical concept, an embodiment of this application further provides a network device, to implement functions of the network device in the foregoing method embodiments. As shown in FIG. 8, the network device may include a sending unit 801 and a processing unit 802.

The sending unit 801 is configured to send first information to a terminal. The first information is used to indicate a first search space, a second search space, a first monitoring parameter, and a second monitoring parameter. The first monitoring parameter is a monitoring parameter for monitoring a PDCCH in the first search space by the terminal. The second monitoring parameter is a monitoring parameter for monitoring a PDCCH in the second search space by the terminal. The first search space is different from the second search space. Alternatively, the first search space is the same as the second search space but the first monitoring parameter is different from the second monitoring parameter.

The processing unit 802 is configured to use the sending unit 801 to: send the PDCCH in the first search space based on the first monitoring parameter, or send the PDCCH in the second search space based on the second monitoring parameter.

In a possible implementation, the sending unit 801 is further configured to send second information to the terminal. The second information is used to instruct the terminal to monitor the PDCCH in the first search space based on the first monitoring parameter, or the second information is used to instruct the terminal to monitor the PDCCH in the second search space based on the second monitoring parameter.

In a possible implementation, the second information is sent to the terminal by using DCI, a MAC CE, or RRC signaling.

In a possible implementation, the processing unit 802 is specifically configured to: when it is determined that the terminal is in a first working mode, send the PDCCH in the first search space based on the first monitoring parameter by using the sending unit 801; or when it is determined that the terminal is in a second working mode, send the PDCCH in the second search space based on the second monitoring parameter by using the sending unit 801.

In a possible implementation, the sending unit 801 is further configured to send third information to the terminal. The third information is used to indicate a working mode of the terminal.

In a possible implementation, the third information is sent to the terminal by using DCI, a MAC CE, or RRC signaling.

In a possible implementation, the processing unit 802 is specifically configured to: when it is determined that discontinuous reception DRX is configured for the terminal, send the PDCCH in the first search space based on the first monitoring parameter by using the sending unit 801; or when it is determined that DRX is not configured for the terminal, send the PDCCH in the second search space based on the second monitoring parameter by using the sending unit 801.

In a possible implementation, the processing unit 802 is specifically configured to: when it is determined that a first DRX parameter is configured for the terminal, send the PDCCH in the first search space based on the first monitoring parameter by using the sending unit 801; or when it is determined that a second DRX parameter is configured for the terminal, send the PDCCH in the second search space based on the second monitoring parameter by using the sending unit 801.

In a possible implementation, the monitoring parameter includes one or more of the following parameters: a format of monitored DCI, a monitoring periodicity, a monitoring slot, monitoring duration in a to-be-monitored periodicity, a monitoring start symbol in a to-be-monitored slot, an aggregation level of a monitored PDCCH, and a quantity of PDCCH candidate locations that need to be monitored at the aggregation level.

In a possible implementation, the network device may further include a receiving unit 803, configured to receive indication information that is used to indicate the working mode of the terminal and that is sent by the terminal.

It should be noted that division of the foregoing units is merely logical function division. In actual implementation, all or some of the units may be integrated into one physical entity, or may be physically separate. In addition, these units may all be implemented in a form of software invoked by using a processing element, or may all be implemented in a form of hardware; or some units may be implemented in a form of software invoked by using a processing element, and some units are implemented in a form of hardware. For example, the receiving unit and the sending unit may be separately disposed, or may be combined into a transceiver unit. In addition, the transceiver unit and the processing unit may be integrated, or may be separately implemented. The processing element may be an integrated circuit and has a signal processing capability. In an implementation process, steps in the foregoing methods or the foregoing units can be implemented by using a hardware integrated logical circuit in the processing element, or by using instructions in a form of software. In addition, the foregoing sending unit is a unit for controlling sending, and may send information by using sending apparatuses such as an antenna and a radio frequency apparatus. Likewise, the receiving unit may alternatively receive information by using receiving apparatuses such as an antenna and a radio frequency apparatus.

The foregoing units may be configured as one or more integrated circuits for implementing the foregoing method, for example, one or more application-specific integrated circuits (ASICs), one or more microprocessors, or one or more field programmable gate arrays (FPGAs). For another example, when a unit in the foregoing units is implemented by scheduling a program by a processing element, the processing element may be a general purpose processor, for example, a central processing unit (CPU) or another processor that can invoke the program. For another example, these units may be integrated together, and are implemented in a form of a system-on-a-chip (SOC).

Figure 9:
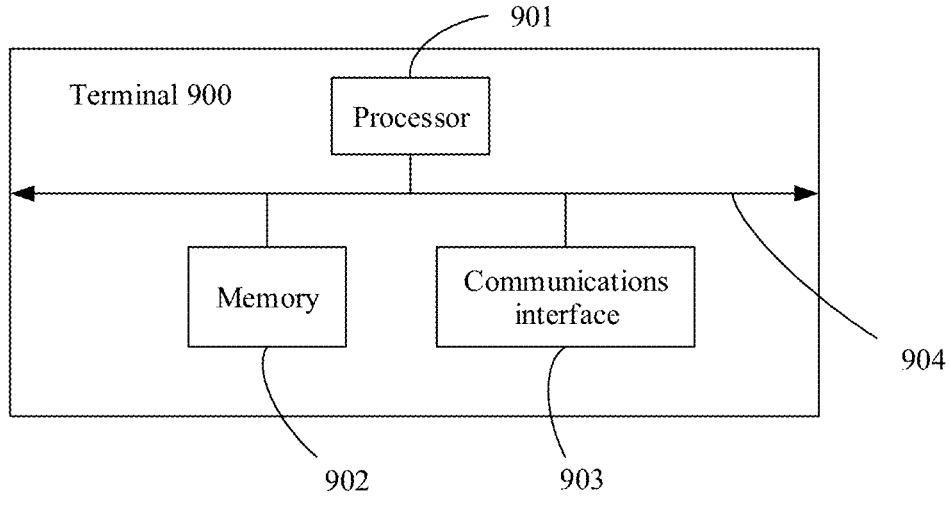
FIG. 9 is a schematic structural diagram 2 of a terminal according to an embodiment of this application.

Based on a same technical concept, an embodiment of this application further provides a terminal, to implement functions of the terminal in the foregoing method embodiments. As shown in FIG. 9, the terminal 900 may include a processor 901, a memory 902, and a communications interface 903. Further, the terminal 900 may further include a communications bus 904.

Specifically, the processor 901 may be a general purpose CPU, a microprocessor, an ASIC, or one or more integrated circuits configured to control program execution in the solutions of this application.

The communications bus 904 may include a path to transmit information between the foregoing components.

The communications interface 903 uses any apparatus such as a transceiver, and is configured to communicate with another device or a communications network, such as Ethernet, a radio access network (RAN), or a wireless local area network (WLAN).

The memory 902 may be a read-only memory (ROM), a static storage device in another type that can store static information and an instruction, a random access memory (RAM), or a dynamic storage device in another type that can store information and an instruction; or may be an electrically erasable programmable read-only memory (EEPROM), a compact disc read-only memory (CD-ROM), or another compact disc storage or optical disc storage (including a compact disc, a laser disc, an optical disc, a digital versatile disc, a Blu-ray disc, and the like), a magnetic disk storage medium, another magnetic storage device, or any other medium that can be used to carry or store desired program code in a form of an instruction or a data structure and that is accessible to a computer. However, the memory 902 is not limited thereto. The memory 902 may exist independently, and is connected to the processor 901 by using a bus. Alternatively, the memory 902 may be integrated with the processor 901.

The memory 902 is configured to store application program code used for executing the solutions of this application, and the processor 901 controls the execution. The processor 901 is configured to execute the application program code stored in the memory 902, to implement the communication method in the foregoing embodiments of this application.

Alternatively, optionally, in this embodiment of this application, the processor 901 may implement related functions in the communication method provided in the foregoing embodiments of this application. The communications interface 903 is responsible for communicating with another device or a communications network. This is not specifically limited in this embodiment of this application.

In specific implementation, in an embodiment, the processor 901 may include one or more CPUs.

In specific implementation, in an embodiment, the terminal may include a plurality of processors. Each of the processors may be a single-core (single-CPU) processor, or may be a multi-core (multi-CPU) processor. The processor herein may be one or more devices, circuits, and/or processing cores for processing data (such as a computer program instruction).

Specifically, the processor 901 may invoke a program stored in the memory 902, to perform the following steps:

Receive, by using the communications interface 903, first information sent by a network device. The first information is used to indicate a first search space, a second search space, a first monitoring parameter, and a second monitoring parameter. The first monitoring parameter is a monitoring parameter for monitoring a physical downlink control channel (PDCCH) in the first search space by the terminal. The second monitoring parameter is a monitoring parameter for monitoring a PDCCH in the second search space by the terminal. The first search space is different from the second search space. Alternatively, the first search space is the same as the second search space but the first monitoring parameter is different from the second monitoring parameter.

Use the communications interface 903 to: monitor the PDCCH in the first search space based on the first monitoring parameter, or monitor, by the terminal, the PDCCH in the second search space based on the second monitoring parameter.

In a possible implementation, the processor 901 is further configured to receive, by using the communications interface 903, the second information sent by the network device. The second information is used to instruct the terminal to monitor the PDCCH in the first search space based on the first monitoring parameter, or the second information is used to instruct the terminal to monitor the PDCCH in the second search space based on the second monitoring parameter.

In a possible implementation, the second information is sent to the terminal by using downlink control information (DCI), a media access control (MAC) control element (CE) (MAC CE), or radio resource control (RRC) signaling.

In a possible implementation, the processor 901 is specifically configured to: when the terminal is in a first working mode, monitor the PDCCH in the first search space based on the first monitoring parameter by using the communications interface 903; or when the terminal is in a second working mode, monitor the PDCCH in the second search space based on the second monitoring parameter by using the communications interface 903.

In a possible implementation, the processor 901 is further configured to receive, by using the communications interface 903, third information sent by the network device. The third information is used to indicate a working mode of the terminal.

In a possible implementation, the third information is sent to the terminal by using DCI, a MAC CE, or RRC signaling.

In a possible implementation, the processor 901 is specifically configured to: when discontinuous reception DRX is configured for the terminal, monitor the PDCCH in the first search space based on the first monitoring parameter by using the communications interface 903; or when DRX is not configured for the terminal, monitor the PDCCH in the second search space based on the second monitoring parameter by using the communications interface 903.

In a possible implementation, the processor 901 is specifically configured to: when a first DRX parameter is configured for the terminal, monitor the PDCCH in the first search space based on the first monitoring parameter by using the communications interface 903; or when a second DRX parameter is configured for the terminal, monitor the PDCCH in the second search space based on the second monitoring parameter by using the communications interface 903.

In a possible implementation, the monitoring parameter includes one or more of the following parameters: a format of monitored DCI, a monitoring periodicity, a monitoring slot, monitoring duration in a to-be-monitored slot, a monitoring start symbol in a to-be-monitored slot, an aggregation level of a monitored PDCCH, and a quantity of PDCCH candidate locations that need to be monitored at the aggregation level.

Figure 10:
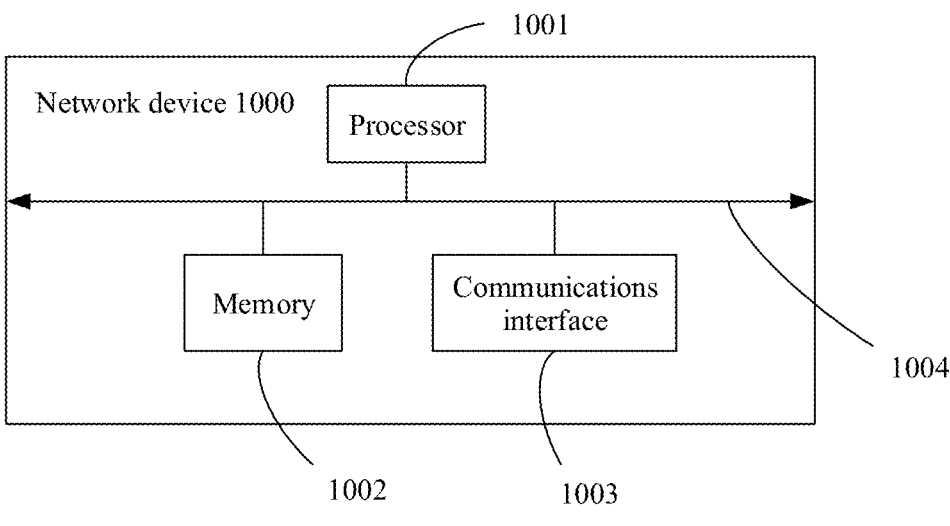
FIG. 10 is a schematic structural diagram 2 of a network device according to an embodiment of this application.

Based on a same technical concept, an embodiment of this application further provides a network device, to implement functions of the terminal in the foregoing method embodiments. As shown in FIG. 10, the terminal 1000 may include a processor 1001, a memory 1002, and a communications interface 1003. Further, the terminal 1000 may further include a communications bus 1004.

Specifically, the processor 1001 may be a general purpose CPU, a microprocessor, an ASIC, or one or more integrated circuits configured to control program execution in the solutions of this application.

The communications bus 1004 may include a path to transmit information between the foregoing components.

The communications interface 1003 uses any apparatus such as a transceiver, and is configured to communicate with another device or a communications network, such as Ethernet, a radio access network (RAN), or a wireless local area network (WLAN).

The memory 1002 may be a read-only memory (ROM), a static storage device in another type that can store static information and an instruction, a random access memory (RAM), or a dynamic storage device in another type that can store information and an instruction; or may be an electrically erasable programmable read-only memory (EEPROM), a compact disc read-only memory (CD-ROM), or another compact disc storage or optical disc storage (including a compact disc, a laser disc, an optical disc, a digital versatile disc, a Blu-ray disc, and the like), a magnetic disk storage medium, another magnetic storage device, or any other medium that can be used to carry or store desired program code in a form of an instruction or a data structure and that is accessible to a computer. However, the memory 1002 is not limited thereto. The memory 1002 may exist independently, and is connected to the processor 1001 by using a bus. Alternatively, the memory 1002 may be integrated with the processor 1001.

The memory 1002 is configured to store application program code used for executing the solutions of this application, and the processor 1001 controls the execution. The processor 1001 is configured to execute the application program code stored in the memory 1002, to implement the communication method in the foregoing embodiments of this application.

Alternatively, optionally, in this embodiment of this application, the processor 1001 may implement related functions in the communication method provided in the foregoing embodiments of this application. The communications interface 1003 is responsible for communicating with another device or a communications network. This is not specifically limited in this embodiment of this application.

In specific implementation, in an embodiment, the processor 1001 may include one or more CPUs.

In specific implementation, in an embodiment, the network device may include a plurality of processors. Each of the processors may be a single-core (single-CPU) processor, or may be a multi-core (multi-CPU) processor. The processor herein may be one or more devices, circuits, and/or processing cores for processing data (such as a computer program instruction).

Specifically, the processor 1001 may invoke a program stored in the memory 1002, to perform the following steps:

Send first information to a terminal by using the communications interface 1003. The first information is used to indicate a first search space, a second search space, a first monitoring parameter, and a second monitoring parameter. The first monitoring parameter is a monitoring parameter for monitoring a physical downlink control channel (PDCCH) in the first search space by the terminal. The second monitoring parameter is a monitoring parameter for monitoring a PDCCH in the second search space by the terminal. The first search space is different from the second search space. Alternatively, the first search space is the same as the second search space but the first monitoring parameter is different from the second monitoring parameter.

Use the communications interface 1003 to: send the PDCCH in the first search space based on the first monitoring parameter, or send the PDCCH in the second search space based on the second monitoring parameter.

In a possible implementation, the processor 1001 is further configured to send second information to the terminal by using the communications interface 1003.

The second information is used to instruct the terminal to monitor the PDCCH in the first search space based on the first monitoring parameter, or the second information is used to instruct the terminal to monitor the PDCCH in the second search space based on the second monitoring parameter.

In a possible implementation, the second information is sent to the terminal by using downlink control information (DCI), a media access control (MAC) control element (CE) (MAC CE), or radio resource control (RRC) signaling.

In a possible implementation, the processor 1001 is specifically configured to: when it is determined that the terminal is in a first working mode, send the PDCCH in the first search space based on the first monitoring parameter by using the communications interface 1003; or when it is determined that the terminal is in a second working mode, send the PDCCH in the second search space based on the second monitoring parameter by using the communications interface 1003.

In a possible implementation, the processor 1001 is further configured to send third information to the terminal by using the communications interface 1003. The third information is used to indicate a working mode of the terminal.

In a possible implementation, the third information is sent to the terminal by using DCI, a MAC CE, or RRC signaling.

In a possible implementation, the processor 1001 is specifically configured to: when it is determined that discontinuous reception DRX is configured for the terminal, send the PDCCH in the first search space based on the first monitoring parameter by using the communications interface 1003; or when it is determined that DRX is not configured for the terminal, send the PDCCH in the second search space based on the second monitoring parameter by using the communications interface 1003.

In a possible implementation, the processor 1001 is specifically configured to: when it is determined that a first DRX parameter is configured for the terminal, send the PDCCH in the first search space based on the first monitoring parameter by using the communications interface 1003; or when it is determined that a second DRX parameter is configured for the terminal, send the PDCCH in the second search space based on the second monitoring parameter by using the communications interface 1003.

In a possible implementation, the monitoring parameter includes one or more of the following parameters: a format of monitored DCI, a monitoring periodicity, a monitoring slot, monitoring duration in a to-be-monitored periodicity, a monitoring start symbol in a to-be-monitored slot, an aggregation level of a monitored PDCCH, and a quantity of PDCCH candidate locations that need to be monitored at the aggregation level.

Based on a same technical concept, an embodiment of this application further provides a communications system, including the foregoing terminal and the foregoing network device.

An embodiment of this application provides a computer readable storage medium. The computer readable storage medium stores a computer instruction. When the instruction is run on a computer, the computer is enabled to implement functions implemented by the terminal in the foregoing method embodiments.

An embodiment of this application provides a computer readable storage medium. The computer readable storage medium stores a computer instruction. When the instruction is run on a computer, the computer is enabled to implement functions implemented by the network device in the foregoing method embodiments.

An embodiment of this application provides a computer program product including an instruction. When the computer program product is run on the computer, the computer is enabled to implement functions implemented by the terminal in the foregoing method embodiments.

An embodiment of this application provides a computer program product including an instruction. When the computer program product is run on the computer, the computer is enabled to implement functions implemented by the network device in the foregoing method embodiments.

An embodiment of this application provides a chip. The chip is connected to a memory, and is configured to read and execute a software program stored in the memory, to implement functions implemented by the terminal in the foregoing method embodiments.

An embodiment of this application provides a chip. The chip is connected to a memory, and is configured to read and execute a software program stored in the memory, to implement functions implemented by the network device in the foregoing method embodiments.

A person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A communication method, comprising:
   receiving first information from a network device, wherein the first information is used to indicate a first group of search spaces and a second group of search spaces, wherein the first group of search spaces comprises at least one search space, the second group of search spaces comprises at least one search space, and the at least one search space comprised in the first group of search spaces and the at least one search space comprised in the second group of search spaces are different;
   receiving second information from the network device, wherein the second information comprises second indication information, and the second indication information is used to indicate the first group of search spaces;
   in response to the second indication information, when monitoring a physical downlink control channel (PDCCH) in the second group of search spaces, starting monitoring a physical downlink control channel (PDCCH) in the first group of search spaces, and stopping monitoring a PDCCH in the second group of search spaces;
   receiving third information from the network device, wherein the third information comprises third indication information, and the third indication information is used to indicate the second group of search spaces; and
   in response to the third indication information, when monitoring a PDCCH in the first group of search spaces, starting monitoring a PDCCH in the second group of search spaces, and stopping monitoring a PDCCH in the first group of search spaces.

2. The method according to claim 1,
   wherein the second indication information comprises information indicating a first index, wherein the first index corresponds to the first group of search spaces; and
   wherein the third indication information comprises information indicating a second index, wherein the second index corresponds to the second group of search spaces.

3. The method according to claim 1, wherein a monitoring periodicity of at least one search space in the first group of search spaces is different from a monitoring periodicity of at least one search space in the second group of search spaces.

4. The method according to claim 1,
   wherein monitoring a PDCCH in the first group of search spaces comprises monitoring the PDCCH in at least one search space comprised in the first group of search spaces; and
   wherein monitoring a PDCCH in the second group of search spaces comprises monitoring the PDCCH in at least one search space comprised in the second group of search spaces.

5. The method according to claim 1, wherein each search space in the first group of search spaces corresponds to a monitoring parameter, and the monitoring parameter is a monitoring parameter used by a terminal for monitoring a PDCCH in the corresponding search space.

6. The method according to claim 5, wherein the monitoring parameter comprises one or more of the following parameters:

a downlink control information (DCI) format to be monitored;

a monitoring periodicity;

a slot to be monitored;

monitoring duration in a to-be-monitored slot;

a starting symbol to be monitored in a to-be-monitored slot; or an aggregation level of a PDCCH to be monitored and a quantity of PDCCH candidates for the aggregation level.

7. The method according to claim 1, wherein the first information is received via radio resource control (RRC) signaling.

8. The method according to claim 1, wherein the second information is received via downlink control information (DCI).

9. A communication method, comprising:

sending first information to a terminal, wherein the first information is used to indicate a first group of search spaces and a second group of search spaces, wherein the first group of search spaces comprises at least one search space, the second group of search spaces comprises at least one search space, and the at least one search space comprised in the first group of search spaces and the at least one search space comprised in the second group of search spaces are different;

sending second information to the terminal, wherein the second information comprises second indication information, and the second indication information is used to indicate the first group of search spaces;

in response to the second indication information indicating the first group of search spaces, when the terminal is monitoring a physical downlink control channel (PDCCH) in the second group of search spaces, sending a physical downlink control channel (PDCCH) in the first group of search spaces instead of sending a PDCCH in the second group of search spaces;

sending third information to the terminal, wherein the third information comprises third indication information, and the third indication information is used to indicate the second group of search spaces; and in response to the third indication information indicating the second group of search spaces, when the terminal is monitoring a PDCCH in the first group of search spaces, sending a PDCCH in the second group of search spaces instead of sending the PDCCH in the first group of search spaces.

10. The method according to claim 9, wherein the second indication information comprises information indicating a first index, wherein the first index corresponds to the first group of search spaces; and wherein the third indication information comprises information indicating a second index, wherein the second index corresponds to the second group of search spaces.

11. The method according to claim 9, wherein a monitoring periodicity of at least one search space in the first group of search spaces is different from a monitoring periodicity of at least one search space in the second group of search spaces.

12. The method according to claim 9, wherein the sending the PDCCH in the first group of search spaces comprises sending the PDCCH in at least one search space comprised in the first group of search spaces; and wherein the sending the PDCCH in the second group of search spaces comprises sending the PDCCH in at least one search space comprised in the second group of search spaces.

13. The method according to claim 9, wherein each search space in the first group of search spaces corresponds to a monitoring parameter, and the monitoring parameter is a monitoring parameter used by the terminal for monitoring a PDCCH in the corresponding search space.

14. The method according to claim 13, wherein the monitoring parameter comprises one or more of the following parameters:

a downlink control information (DCI) format to be monitored;

a monitoring periodicity;

a slot to be monitored;

monitoring duration in a to-be-monitored slot;

a starting symbol to be monitored in a to-be-monitored slot; or an aggregation level of a PDCCH to be monitored and a quantity of PDCCH candidates for the aggregation level.

15. The method according to claim 9, wherein the first information is sent to the terminal via radio resource control (RRC) signaling.

16. The method according to claim 9, wherein the second information is sent to the terminal via downlink control information (DCI).

17. The method according to claim 9, wherein the working mode comprises at least one of the following parameters:

a value of an operating bandwidth;

a quantity of activated carriers; or a quantity of transmit/receive antennas during multiple-antenna multiple-input multiple-output (MIMO) communication.

18. The method according to claim 9, wherein the working mode comprises a normal working mode or a power saving mode.

\* \* \* \* \*